(12) United States Patent
Albisu et al.

(10) Patent No.: US 7,707,626 B2
(45) Date of Patent: Apr. 27, 2010

(54) AUTHENTICATION MANAGEMENT PLATFORM FOR MANAGED SECURITY SERVICE PROVIDERS

(75) Inventors: Luis F. Albisu, Fairfax Station, VA (US); Cheryl L. Furst, Falls Church, VA (US); James W. Holloway, Orlando, FL (US); Tien Y. Hurr, Potomac, MD (US); Jonathan C. Lee, Fairfax, VA (US); Michael F. Wallace, Fairfax, VA (US); Alton W. Drake, II, Orlando, FL (US)

(73) Assignee: AT&T Corp., New York, NY (US)

( * ) Notice: Subject to any disclaimer, the term of this patent is extended or adjusted under 35 U.S.C. 154(b) by 1175 days.

(21) Appl. No.: 11/141,862

(22) Filed: Jun. 1, 2005
(Under 37 CFR 1.47)

(65) Prior Publication Data
US 2006/0288405 A1 Dec. 21, 2006

(51) Int. Cl.
G06F 7/04 (2006.01)
(52) U.S. Cl. .............................................. 726/8; 726/9
(58) Field of Classification Search ..................... 726/8, 726/9
See application file for complete search history.

(56) References Cited

U.S. PATENT DOCUMENTS

| 5,491,752 | A | * | 2/1996 | Kaufman et al. ............... 380/30 |
|---|---|---|---|---|
| 5,544,322 | A | | 8/1996 | Cheng et al. |
| 5,606,614 | A | | 2/1997 | Brady et al. |
| 5,684,950 | A | | 11/1997 | Dare et al. |
| 5,774,551 | A | | 6/1998 | Wu et al. |
| 6,014,650 | A | | 1/2000 | Zampese |
| 6,510,236 | B1 | | 1/2003 | Crane et al. |
| 6,618,806 | B1 | | 9/2003 | Brown et al. |
| 6,651,168 | B1 | | 11/2003 | Kao et al. |
| 6,697,845 | B1 | | 2/2004 | Andrews |
| 6,704,873 | B1 | | 3/2004 | Underwood |
| 6,715,082 | B1 | | 3/2004 | Chang et al. |
| 6,721,713 | B1 | | 4/2004 | Guheen et al. |
| 6,748,543 | B1 | | 6/2004 | Vilhuber |
| 2003/0204632 | A1 | | 10/2003 | Willebeek-LeMair et al. |
| 2004/0059952 | A1 | * | 3/2004 | Newport et al. ............. 713/202 |
| 2004/0117665 | A1 | | 6/2004 | Ong |
| 2004/0139028 | A1 | * | 7/2004 | Fishman et al. ............... 705/67 |
| 2005/0015588 | A1 | * | 1/2005 | Lin et al. ..................... 713/159 |
| 2005/0091543 | A1 | * | 4/2005 | Holtzman et al. ........... 713/202 |
| 2006/0015358 | A1 | * | 1/2006 | Chua ............................ 705/1 |
| 2007/0005986 | A1 | * | 1/2007 | Bernard et al. .............. 713/185 |

FOREIGN PATENT DOCUMENTS

DE 100 43 554 A1 3/2002

OTHER PUBLICATIONS

EP Examination Report for 06270053.9, Oct. 29, 2008, consists of 7 pages.

* cited by examiner

Primary Examiner—Kambiz Zand
Assistant Examiner—Teshome Hailu

(57) ABSTRACT

An authentication management platform that enables authentication systems from various vendors to be integrated into a single service offering. The disclosed arrangement can support multiple, distinct customers and multiple primary authentication servers on a single platform. The management platform provides access only to users that enter a valid passcode comprising both: (1) a personal identification number (PIN) and (2) the current code generated by a security token card assigned to that user. The authentication management platform may be configured to be controlled and maintained by the subscriber to the system, or may be serviced/maintained by a third party service provider.

9 Claims, 9 Drawing Sheets

AUTHENTICATION MANAGEMENT PLATFORM FOR MANAGED SECURITY SERVICE PROVIDERS

TECHNICAL FIELD

The present invention is directed to an authentication management platform and, more particularly, to a platform that enables authentication platforms from various vendors to be integrated into a single service offering. The inventive arrangement is further capable of supporting multiple, distinct customers as well as multiple primary authentication servers within a single platform.

BACKGROUND OF THE INVENTION

It is commonplace today for computer users to connect their machines to other computers, and particularly, servers, throughout a network. The network may be a private network, such as a corporate intranet of networked computers that is accessible only to computer users within that corporation, or it may be a public network, such as the Internet. The Internet is well known as a vast collection of computing resources, interconnected as a network, from sites around the world.

A user may connect his computer to a server using a "wireline" connection or a "wireless" connection. Wireline connections are those that use physical media (such as cables, optical fibers or telephone lines) to provide a connection, whereas wireless connections use media such as satellite links, radio frequency waves, and infrared waves. Many connection techniques can be used with these various media, including: using the computer's modem to establish a connection over a telephone line; using a local area network (LAN) card such as Token Ring or Ethernet; using a cellular modem to establish a wireless connection, and the like. The user's computer may be any type of device having processing and communication capabilities. Traditionally, such devices include desktop, laptop and handheld computers.

Conventional user ID and password schemes for controlling user access to network resources are also well known. Recently, it has been proposed to provide client workstations in a network with so-called "alternative" authentication devices for access control purposes. Such devices include, for example, "token cards" and "biometric" (e.g., finger, eye or voice print) scanners. One problem with these current alternatives is that each authentication device vendor has a different way of encoding input information and validating the user's identity.

In a multiuser computer system, identification and authentication mechanisms are essential for identifying and authenticating each individual who requests any usage of system resources. The most common implementation of such mechanisms is a user identification (ID) along with a password. Thus, each multiuser computer system contains, as a minimum, a unique sign-on ID for each registered user to the system. This allows for accountability of system usage down to the individual user level.

However, when such user identification and authentication implementation methodology is extrapolated to more than one computer system within a distributed computing environment, a user must repeatedly provide a user ID along with an appropriate password in order to gain access to each computer system. For a user who wishes to gain access to several different services within a single session, each provided by a different computer system, this repetitious sign-on procedure tends to be very tedious (if not annoying). In most cases, in particular, the user ID and password must be transmitted to a remote computer system. Without a secure path between the user's computer system and the remote computer system, anyone who has access to the distributed computing environment could use a network analyzer to discover the user ID and password of the user. As such, the effectiveness of the sign-on procedure as a means of security measure may be undermined.

One solution for single sign-on and authentication in a distributed computing environment is known as "Kerberos". Kerberos is an authentication protocol developed as part of Project Athena at MIT and provides a platform for single sign-on and authentication in an open network environment. Unfortunately, Kerberos support is not transparent and requires various custom modifications to the required applications and system utilities in order to perform adequately in various circumstances.

SUMMARY OF THE INVENTION

The need remaining in the prior art is addressed by the present invention, which relates to an authentication management platform and, more particularly, to a platform that enables authentication systems from various vendors to be integrated into a single service offering.

In particular, the present invention is based on the use of two, disjunctive pieces of information for successful authentication of a user. To gain access to the protected system, users must enter a valid passcode, which comprises: (1) a secret, memorized personal identification number (PIN); and (2) the current code generated by a security token card assigned to that user. The first factor is something only the user should know. The second factor is something unique that the user possesses: a code from his/her token, where the code generated by the token changes on a continual basis (and is required to be synchronized with a password server that stores the token codes). Requiring both factors, in accordance with the present invention, ensures exceptionally secure user authentication and access control.

In one embodiment of the present invention, the token authentication service may be provided as a "turn key" solution, where the customer is given the responsibility for maintaining the authentication system, distributing tokens and maintaining passwords. Alternatively, a customer (such as a corporate customer with a highly distributed network and a large number of users) may subscribe to a token authentication service that is managed by a third party/service provider. The same principles of PIN/token authentication apply to either embodiment.

Other and further embodiments and arrangements of the present invention will become apparent during the course of the following discussion and by reference to the accompanying drawings.

BRIEF DESCRIPTION OF THE DRAWINGS

Referring now to the figures.

DETAILED DESCRIPTION

Figure 1:
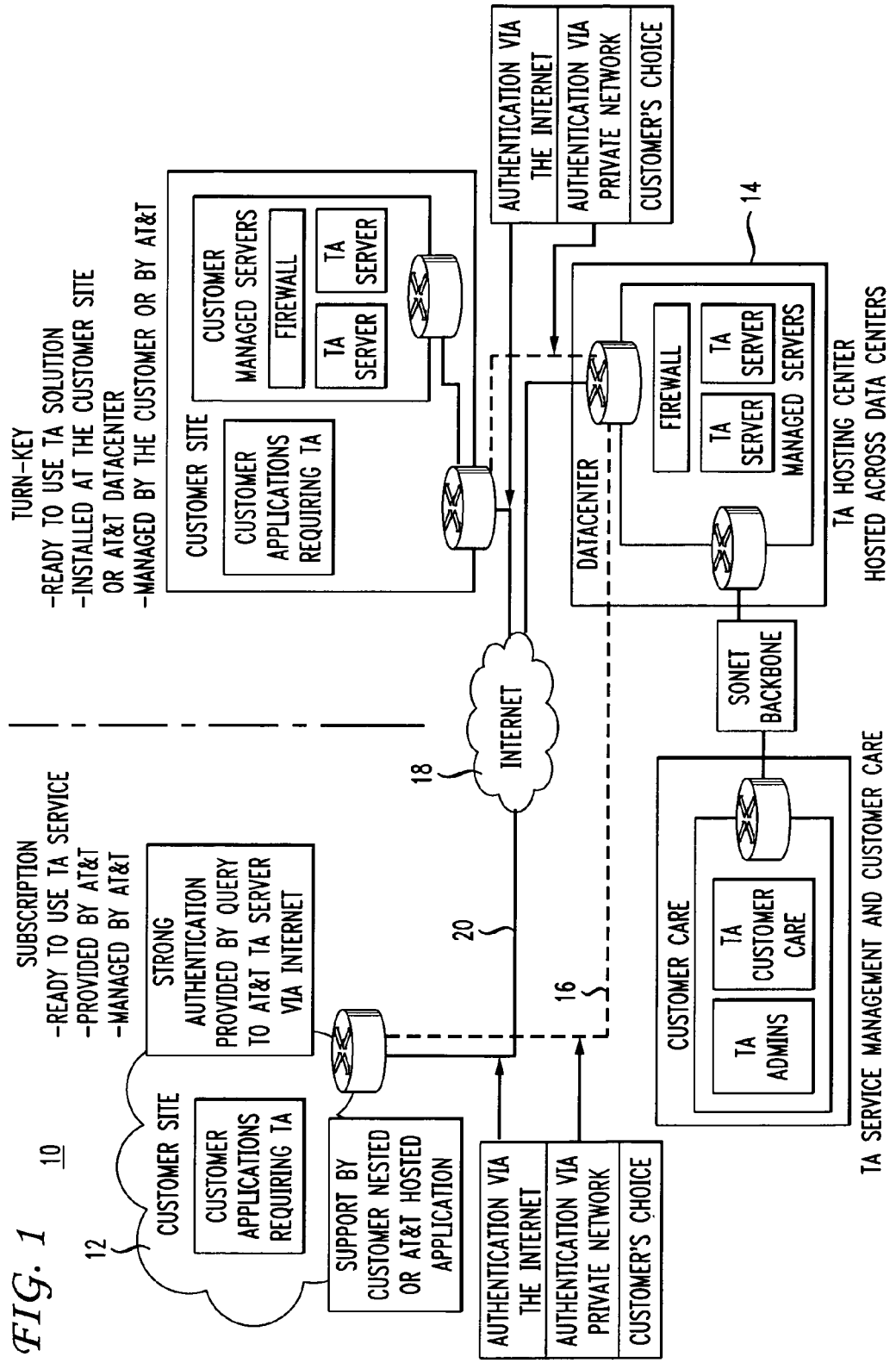
FIG. 1 illustrates an exemplary architecture for implementing the two-factor authentication methodology of the present invention.

As mentioned above, the most common form of authentication is passwords—something a user knows. Unfortunately, passwords are extremely weak as they are easily uncovered or guessed (the most common password is "password") by ingenious imposters. As a result, a security policy based solely on passwords leaves the organization vulnerable. An organization must take advantage of strong authentication mechanisms that combine one or more of the authentication methods mentioned above if it wants to minimize the risk of unauthorized access.

In accordance with the present invention, a two-factor authentication approach has been developed that allows for an organization to positively identify "who" is on the other end of an electronic transaction. Two-factor authentication ensures greater network security than the traditional static password by combining something the user knows (a secret PIN) and something the user has (an authenticator or token code), thus providing a higher level of assurance. This type of two-factor authentication, in accordance with the present invention, makes it much harder for a hacker to gain access to authentication credentials, since the token code changes every minute (or any other regular time interval) and must be combined with a secret PIN to gain access. Indeed, the foundation of the inventive authentication offering consists of a centralized password server (storing both PINs and token codes) that is used in conjunction with code-generating tokens. Together, they offer a security mechanism for providing strong, two-factor authentication. As mentioned above, to gain access to the protected system, users must enter a valid passcode, which is made up of: (1) a secret, memorized personal identification number (PIN), and (2) the current code generated by a token assigned to the user. The first factor is something the user alone knows. The second factor is something unique that the user possesses, a code from his/her token-generating device. Requiring both factors ensures exceptionally secure user authentication and access control.

The token card continually generates a series of random one-time passwords that can be used only once to log into a network access server. The token card works in conjunction with a password server (e.g., an ACE server) that generates synchronized, one-time passwords that are used to validate the one-time passwords that are received from the token cards. Since the password server generates a unique response for every login attempt, the one-time password will only be valid for a single session. Thus, even if monitored or stolen, the one-time password cannot be re-used by an intruder to gain access to a user's account. To use the token card, the user typically enters a series of digits and letters as displayed on the token card in the prompt window, or inserts the card into a reader that is coupled to the network. The password server internally generates one-time passwords in synchronization with the token card. The one-time password, in association with the PIN, (i.e., passcode) is then used to verify that the user is allowed to log into the network access server through the remote device, thereby allowing the user to gain access to the network system by comparing the passcode to the password server's passcode at a particular instant in time.

FIG. 1 illustrates an exemplary architecture 10 for implementing the two-factor authentication methodology of the present invention, in either a "subscription" form or a "turn-key" form. In the "subscription" form, the service provider retains control of the authentication process and a request for "token authentication" (TA) is sent by a customer at location 12 to the service provider's datacenter 14 that hosts the authentication service. The request for authentication may be transmitted by either a private network connection 16 or through the Internet 18 via a data connection 20 to datacenter 14. The request includes the user's PIN and the current code value of his/her token. Both entered values are compared against those stored in a provisioning server 22 at datacenter 14. If both values exist and are associated with this user, the user is "authenticated" to enter the computer network(s) controlled by the customer (corporate) entity associated with controlling access to those networks. In contrast, for the "turn-key" form, a customer's (corporate) complete dataset of PINs and tokens associated with their authenticated users is uploaded onto a customer-managed provisioning server 24 at a customer/corporate location 26. In this case, a user requesting authentication merely submits the request to provisioning server 24 and is either granted or denied access to the secured network(s).

Figure 2:
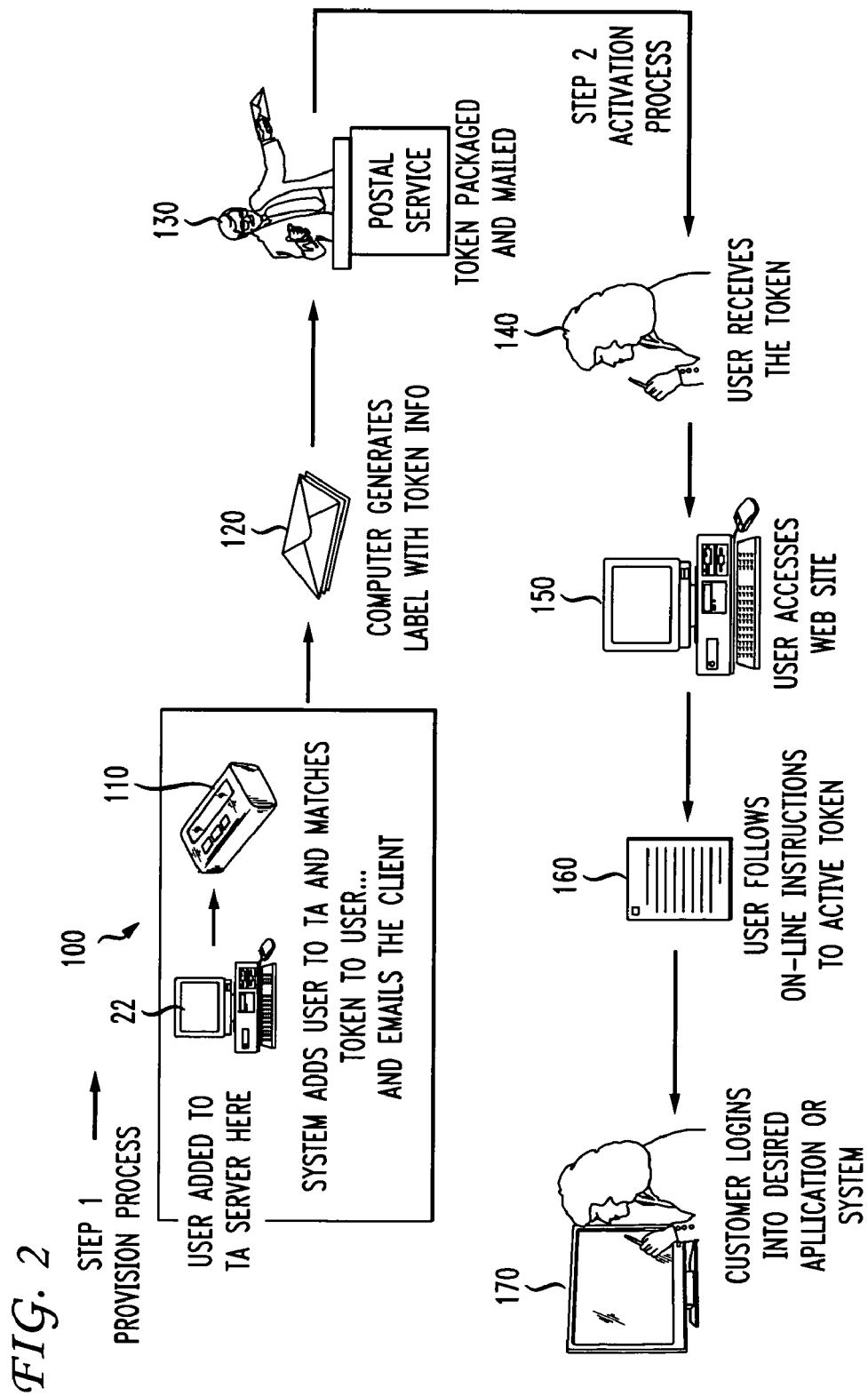
FIG. 2 illustrates a process flow associated with allowing a customer who desires access to the protected system to apply for and receive the necessary token information.

FIG. 2 illustrates a process flow associated with allowing a customer who desires access to the protected system to apply for and receive the necessary security token. As shown, the process begins with an authenticated user being added to the security service provider's provisioning server 22 (step 50). The authentication system then matches a security token 32 to the user and emails a confirmation to the user (step 55). The security token information and card are then generated (step 60) and sent (step 65) through an outside delivery system such as, for example, the US Postal Service, to the user's physical location (step 70). Once token 32 has been delivered to the user (step 75), the activation process begins with the user accessing the TA web site (step 80) and following the instructions to activate his/her token 32 (as will be discussed in detail below). The web server provides access to information about the service and provides pages for provisioning and maintaining users' tokens. For example, TA users will access the web server to apply for new tokens, enable tokens, reset PINs, report lost tokens, set temporary passcodes, request replacement tokens, resync tokens, test tokens, update user profiles, update security profiles, and request customer assistance. Additionally, pre-identified company individuals (the "single-point-of-contact" (SPOC)) responsible for the access system will be able to add/edit a company profile, add users, and manage users associated with their company. Upon the activation being successful, the user may then log into the desired application or system (step 85).

Figure 3:
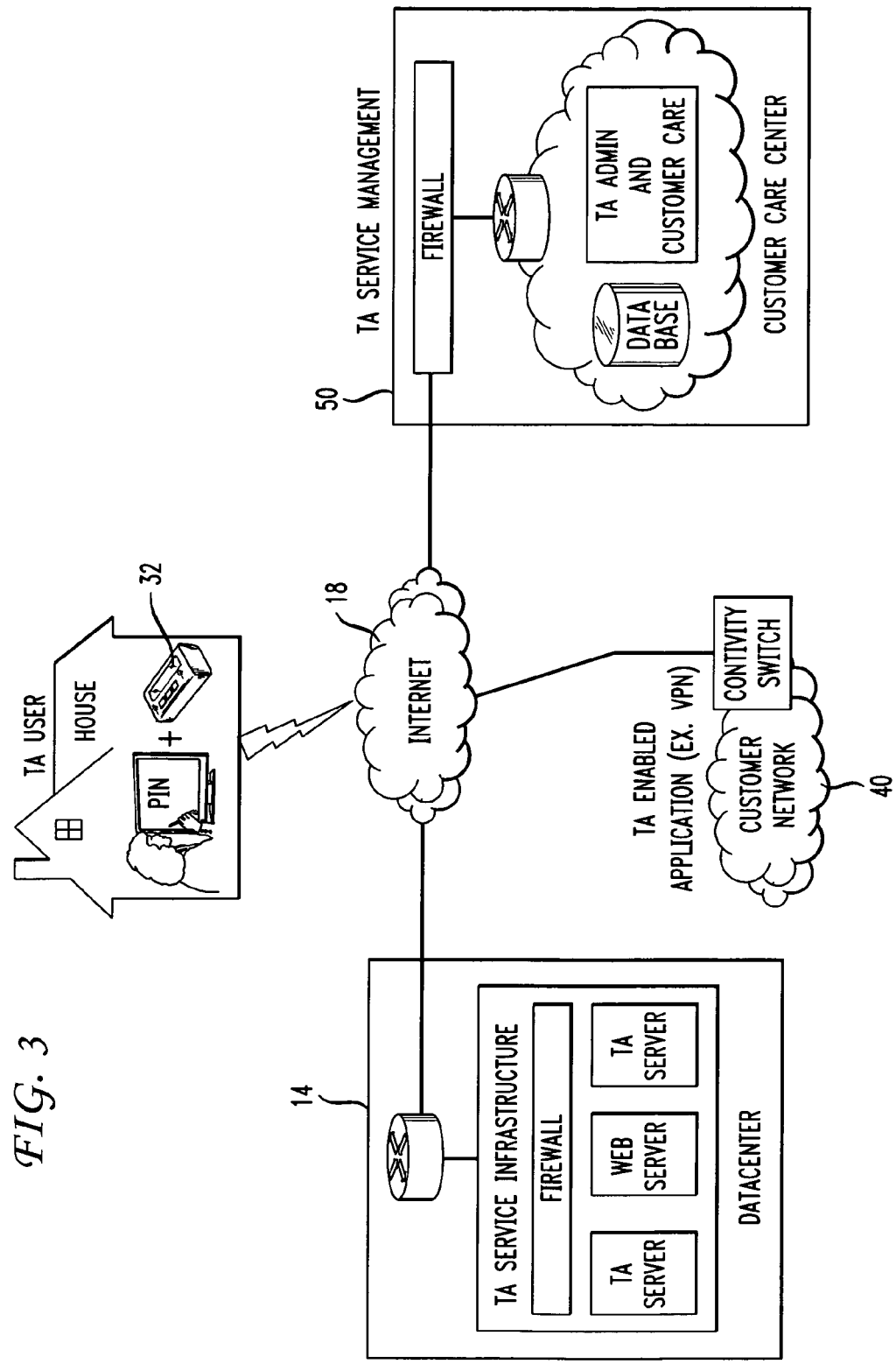
FIG. 3 contains a block diagram illustrating the operation of the two-factor token authentication (TA) system of the present invention once a user's security token has been activated for the first time.

FIG. 3 contains a block diagram illustrating the operation of the two-factor token authentication (TA) system of the present invention once a user's security token has been activated for the first time (as discussed above). Referring to FIG. 3, when a user desires to access the system, the user enters the current value of his/her token 32 (where, as understood, this value changes on a regular basis) and his/her PIN. The token number+PIN (i.e., passcode) is then transmitted through Internet 18 to a customer network 30 to which the user desires to gain access. Customer network 30 then forwards the passcode information to provisioning server 22 for validation. Provisioning server 22 is the principal component providing service in support of the inventive two-factor authentication service. Provisioning server 22, in association with accompanying database(s), provides a centralized location for managing TA users (i.e., user IDs, PINs and token code generator) and, most importantly, provides the ability to approve or deny user authentication requests from TA-enabled applications. If validated, the approval is transmitted from provisioning server 22 to customer network 30 and access is granted to the user. If a problem arises with the validation, the user may be transferred to a customer care center 35, where a customer care agent may be able to review the user's information and determine if a problem exists and can be corrected. As will be discussed below, customer care center 35 may also function to replace "lost" tokens, enable/disable tokens, etc.

Each system user must have a user ID and PIN to authenticate to TA-enabled applications. A user is provided with a temporary PIN (or will be assigned a PIN) upon being issued a token code generator. If the user is provided with a temporary PIN, the user will personalize the PIN for future access to the secure system. In most cases, a token generator (such as token generator 32) will generate a unique N-digit numerical code every X seconds (typically, N=6 and X=60, although other values may be used). The token code is generated using an internal seed unique to the generator and in association with the current "Universal Coordinated Time" (UTC). The user will provide the token code, along with the user ID and PIN to be authenticated to applications. At provisioning server 22 (or corporate provisioning server 24, as the case may be), the user ID and PIN will be validated and the token code entered by the user will be compared against the "current" value generated at provisioning server 22. If the token codes match, the user will be authenticated and permitted to access the secure computer network.

Figure 4:
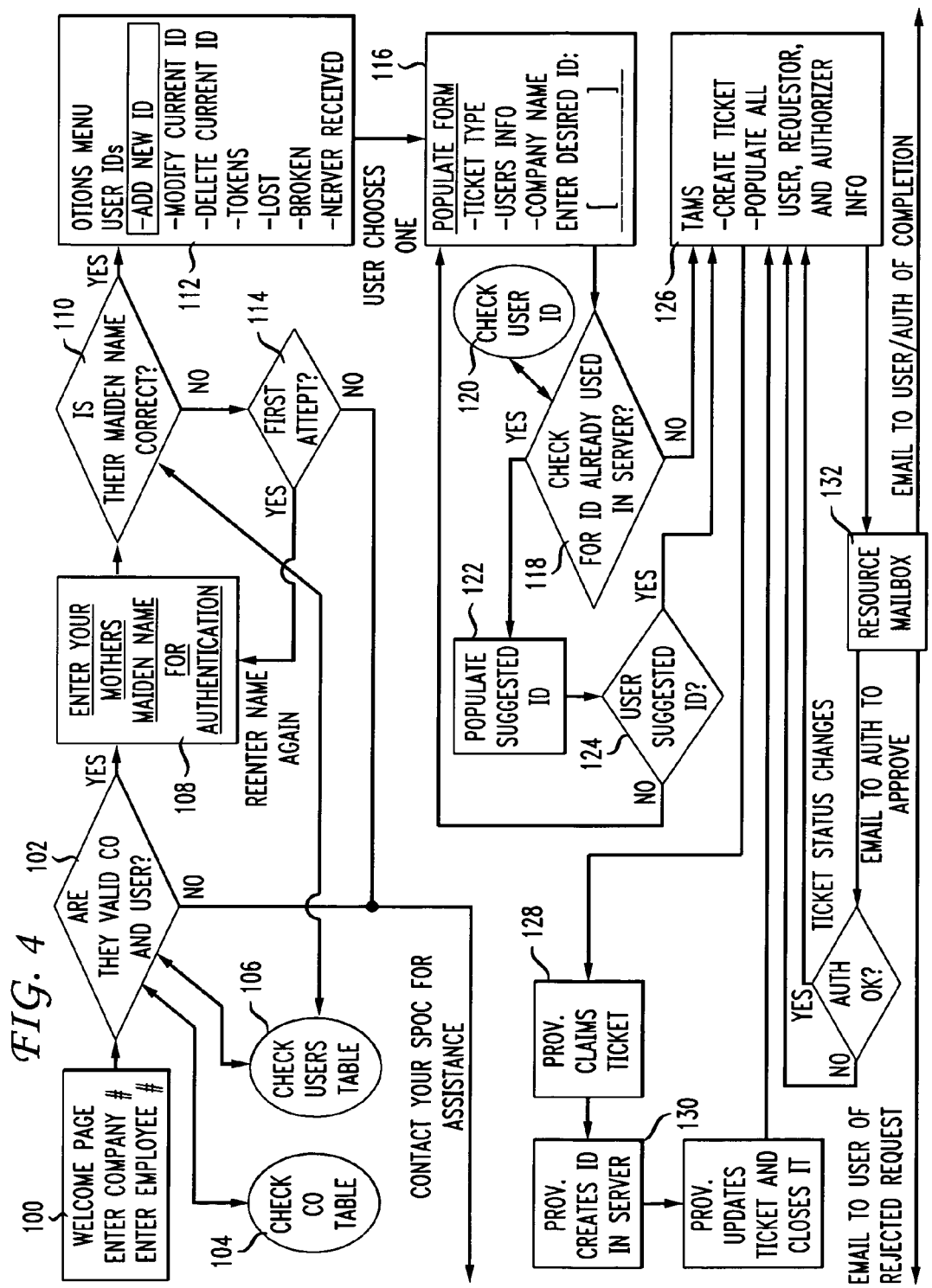
FIG. 4 contains an exemplary flowchart associated with the process of adding a new user to the TA system of the present invention.

The following flowcharts of FIGS. 4-9 will describe in detail various exemplary processes associated with validating new users to, and monitoring/providing customer care for existing users of, the inventive two-factor TA system of the present invention. FIG. 4 contains, in particular, an exemplary flowchart associated with the process of adding a new user to the two-factor TA system of the present invention. As shown, the process begins with a potential "new" user being presented a welcome page 100 as a GUI on his/her computer. The user then enters the company information, as well as particular and employee information (preferably, a unique "employee number"). At step 102, the entered company and employee information is checked to determine the validity of both the company and the potential new user. The company information, in this case, is stored within a company table 104 and the user information is stored within a user table 106 (although in another embodiment both tables may be located in the same database structure). If both entries are found in their respective tables 104 and 106, the user is presumed valid, and passes on to the next step in the identity management and authorization process. If one or both of the entries is determined to be invalid, the user may be directed to, in this case, a customer care agent for assistance (alternatively, the user could be given one more opportunity to enter the required information, on the assumption that a data entry error occurred. If unsuccessful on a second attempt, the user may then be directed to a customer care agent).

Presuming that both the company number and user number are valid, the potential new user is next presented with a screen 108 that prompts for the user to enter a predetermined set of "security words" (for example, mother's maiden name) for authentication. At step 110 the entered information is compared against the stored "security words" value for that particular user in user table 106. If the authentication information is correct, the user is presented with an options menu 112. If the information is incorrect, a determination is made at step 114 whether or not this is a first data entry attempt. If so, the user is given another opportunity to enter the correct authentication information. If the user has failed twice to enter the proper "security words", the user is directed, as above, to a customer care agent for assistance or another method of identity verification (it is to be noted that this option of giving the user a second try is optional; the user may be sent directly to a customer care agent/alternate identification verification method after a first failed attempt. Alternatively, a user may be given three or more tries to enter the proper information before being sent to customer care or an alternate identity verification. Any of these alternatives are considered to fall within the spirit and scope of the present invention).

The options menu 112 presented to the user is, at this point, a high-level menu of every option available to both new users and existing users. As shown, these options include adding a new user ID, modifying a current user ID, deleting a current user ID. With respect to the second factor (i.e., the code-generating token) in this two-factor TA system, the user options offer, among others, assistance with lost tokens, broken tokens, or with the problem of never having received a token. In the example associated with FIG. 4, the user wants to be added to the system, so the option of "Add New ID" is selected, and form 116 is presented to the user for more data entry. In this case, form 116 may already be populated with the user's information and company name, as well as a "ticket type" that is used to track this particular chain of events through the system. The user is prompted to "enter desired ID", as shown, into form 116. The user-entered ID is then checked, at step 118, against a table 120 of user ID's for that particular company. If the user-entered ID is already in use, the system may suggest an alternative user ID at step 122. The user may then decide, at step 124, to either accept the suggested user ID, or return to form 116 and enter another user ID of his own choosing. Once an acceptable user ID has been found, the process moves on to "token authentication management system" (TAMS) 126 which functions to create an authenticated existence in provisioning server 22 (if the security arrangement is of the "subscribed" form) for this particular user as a valid member/user of the associated company's computer network(s).

If the particular system is of the "turn-key" form, the user ID update information is forwarded at step 128 to the company's provisioning server 24. Upon completion of the addition of the new user ID to local provisioning server 24, a confirmation email is sent to the user, at step 132, informing the user of the completion of the user ID process. If any step in the process has been unsuccessful, the "disqualified" user is sent an email message of the rejected request.

Figure 5:
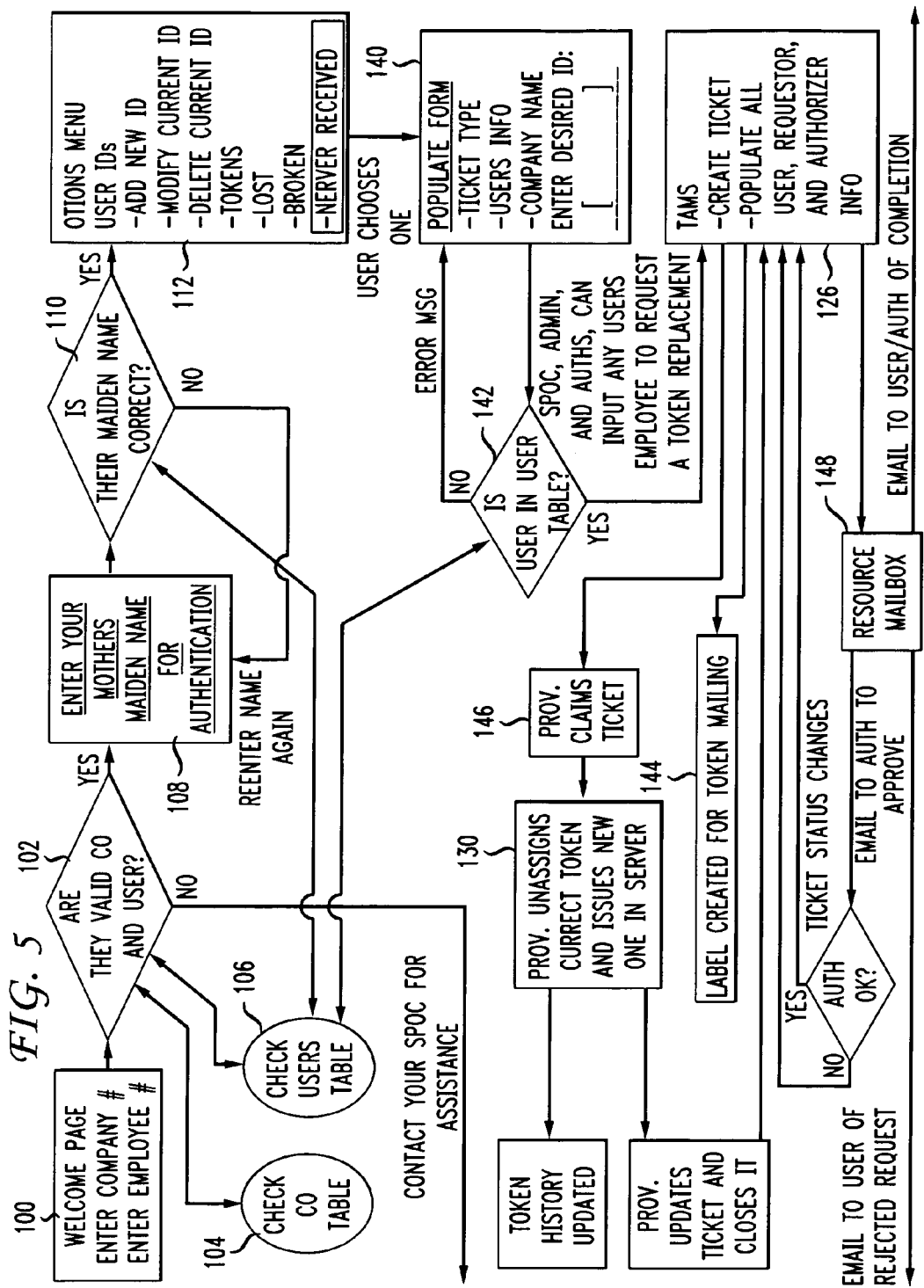
FIG. 5 contains a flowchart of an exemplary process for generating a new security token for a "new user"

An exemplary process flowchart for generating a new security token for a "new user" (that is, a user who has successfully completed the process discussed above in association with FIG. 4), is illustrated in FIG. 5. It is to be understood that an essentially identical process, as discussed below, may be used if an already-issued security token is lost or becomes defective. Referring to FIG. 5, the process for issuing a new security token begins in a manner similar to that for adding a new user, as discussed above in association with FIG. 4. The process begins to diverge when the user selects a different option from options menu 112. In this case, the user selects, from the "tokens" category, the option "never received". Upon this selection, the user is presented with form 140, which either includes or asks the user to populate his/her personal information and company name. In response to the prompt in form 140, the user is requested to enter his/her employee number, where at step 142 the process confirms that the entered user number can be found in user table 106 and is valid. If a match is not made, an error message is generated and the user is given another opportunity to enter his/her employee number on form 140 (although not shown in the flowchart of FIG. 5 for the sake of clarity, the user may be given a selected number of attempts N, where after N failed attempts the "user" is invalidated). As noted in the flowchart of FIG. 5, various company-related individuals may be authorized to input employee numbers and request tokens for the identified employees.

Once an employee number has been entered and validated, the process passes to TAMS 126, which functions to populate the user's token information and create the documents and security token device at step 144, where the documents and token device are then mailed to the user. In the case where the "turn key" alternative is employed, the new token information is sent to the company's provisioning server 24 at step 146. Once the token production process is completed, an email confirmation (of success or failure) is sent to the user at step 148.

Figure 6:
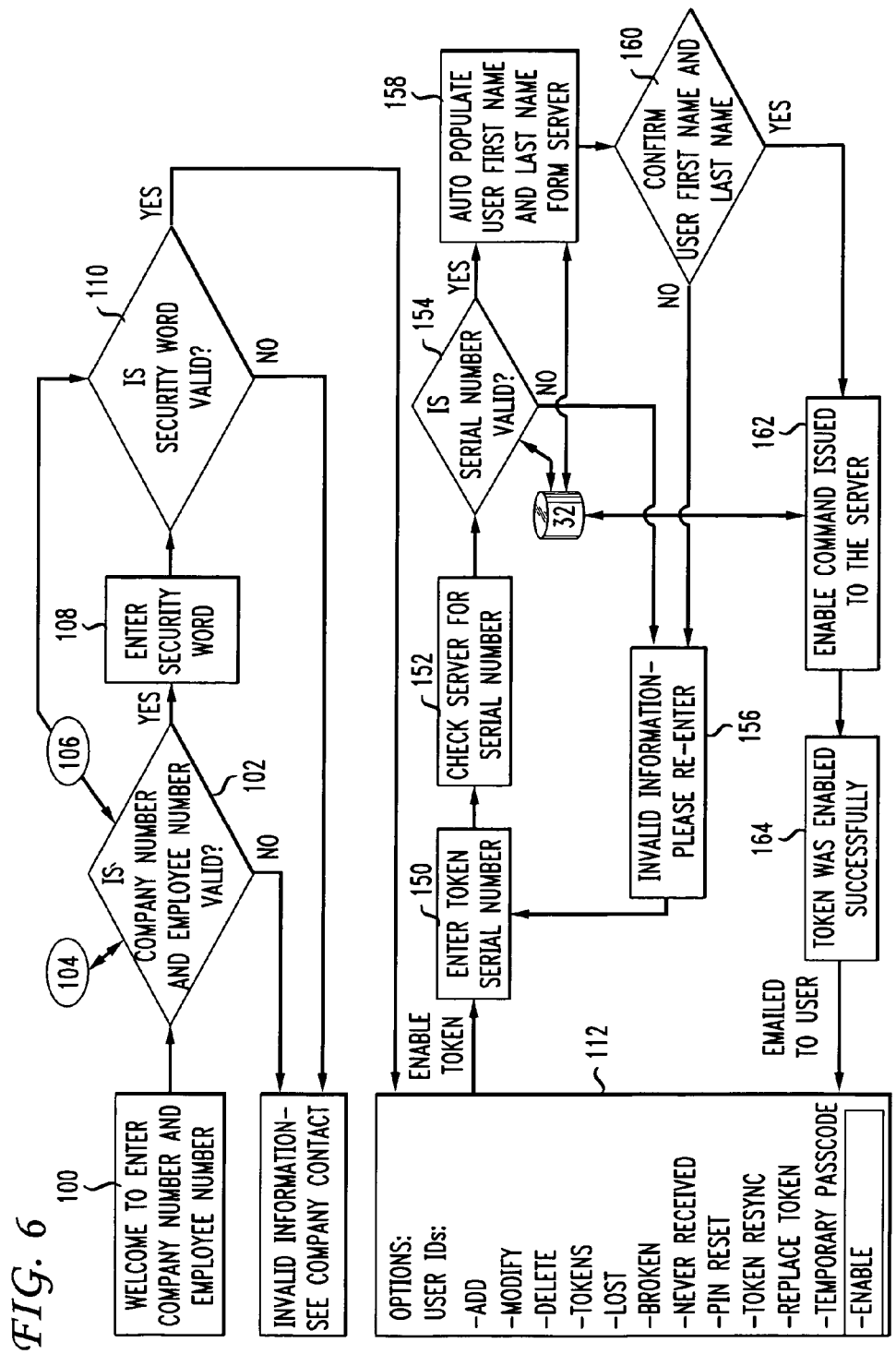
FIG. 6 illustrates one exemplary process that may be implemented in accordance with the present invention to provide activation of a delivered user security token.

As discussed above in association with FIG. 2, once a token has been assigned to a user, the token and associated information is sent via US mail (or any other suitable delivery service) to the user. The received security token then requires activation prior to allowing the user to have access to the network (see steps 80 and 85 in FIG. 2). The flowchart of FIG. 6 illustrates one exemplary process that may be implemented in accordance with the present invention to provide this activation. As shown, the process begins in a manner similar to the initialization processes shown in FIGS. 4 and 5. In this case, when the user reaches options menu 112, the user selects "enable token" as the option, which then presents screen 150 to the user, prompting the user to enter his/her token serial number. At step 152, the process continues by checking the entered serial number against that stored in the provisioning server 22 at datacenter 14. The comparison occurs at step 154, where if there is no match, the user is prompted to re-enter the serial number at step 156.

Presuming the serial number of the security token is valid, the process continues at step 158 by having the system display the user's first and last names for confirmation purposes at step 160. If the user's proper names appear, the two-factor TA system of the present invention will then issue an "enable" command to provisioning server 22, which will thereafter allow the user to enter the password/PIN+token information to access the system. The success of the enablement process is also fed back, at step 164, to the user's list of options in screen 112, so that for the case of this particular user the system will "know" that his/her token has been enabled. Once the token has been enabled, the user can thereafter access the secure system, in the manner as discussed above in association with FIG. 3. It is to be understood that the user's access permissions expire once the user "logs off" of the system. The user will need to re-enter his PIN number, and the "new" value displayed on his token the next time he/she desires to access the network. It is an aspect of the present invention that the use of the PIN+token adds a level of "randomness" to the login process by virtue of the token code being different during each login.

Figure 7:
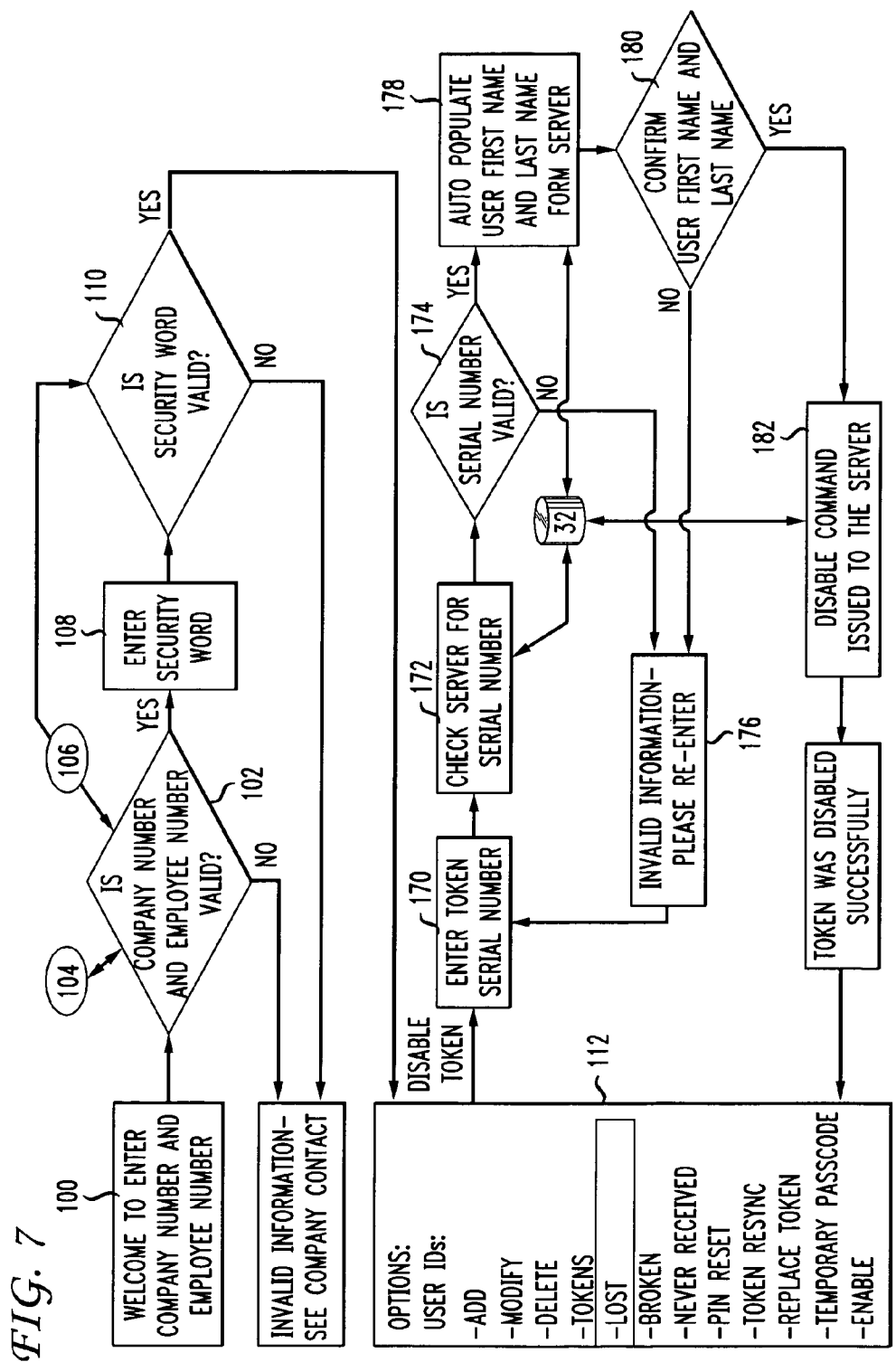
FIG. 7 contains a flowchart illustrating an exemplary process that may be used to "disable" an issued token.

In the course of a user's accessing of the computer system from a variety of locations over an extended period of time, there may arise the situation where the security token card issued to the user is lost, becomes defective, expires, or needs to be returned (for example, when an employee leaves the company). FIG. 7 contains a flowchart illustrating an exemplary process that may be used to "disable" an issued token (where, as shown, only the user may disable the token. It is to be understood that other situations may require a system administrator to access the system and disable a token, particularly when the user is an ex-employee). Referring to FIG. 7, the initial steps in the "disable" process are identical to those discussed above. When the user reaches options screen 112, the token option of "lost" (for example) is selected. This selection then leads to step 170, which prompts the user for the token serial number. The entered serial number is then compared, at step 172, against the list of token serial numbers within provisioning server 22 and a determination is made at step 174 regarding the validity of the entered serial number. If there is no match to the user-entered serial number, the user is prompted at step 176 to re-enter the serial number of the "lost" token.

Presuming the entered serial number is valid and identifies the token issued to that user, the process continues by retrieving the user's name from provisioning server 22 and displaying it at step 178 for verification by the user (at step 180). If the user's name does not match the valid serial number, the process returns to step 176, which prompts the user to re-enter a token serial number. If the user confirms that the valid serial number is indeed his, the process continues by sending a "disable" command, at step 182 to provisioning server 22, requesting that server 22 turn "off" that particular token. A message that the token was successfully disabled is then transmitted, at step 184, back to options list 112.

Figure 8:
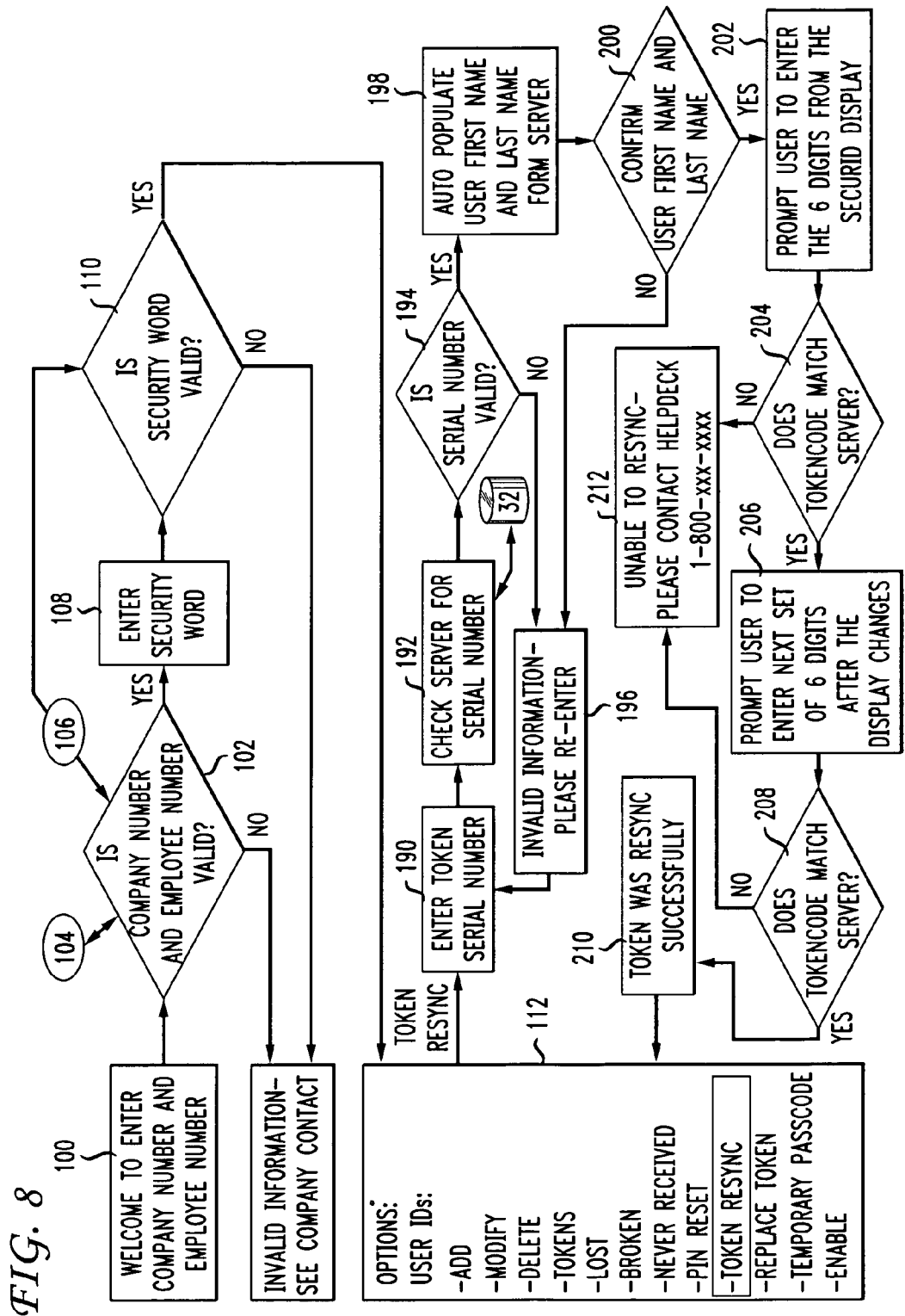
FIG. 8 contains a flowchart associated with an exemplary process that may be used to "re-synchronize" an issued token with the information in password server.

The occasion may arise where the security token becomes out of sync with code generation unit within provisioning server 22. This will become obvious to the user when multiple entry attempts are denied. The flowchart as shown in FIG. 8 is associated with an exemplary process that may be used to "re-synchronize" an issued token with the information in provisioning server 22. Upon reaching options screen 112, the user selects the "token resync" option. The user is then prompted, at step 190, to enter the serial number of his/her token. The entered serial number is then checked against those stored in provisioning server 22, at step 192. A comparison is made in step 194, where if no match is found, the user is prompted to re-enter the token serial number at step 196. If the serial number is valid, the "re-sync" process continues, at step 198, with the process automatically populating a screen with the first and last names of the user associated with the validated token serial number. At step 200, the user confirms that it is his name that is displayed. If there is not a match between the user's name and token serial number, the process returns to step 196 and the user is prompted to re-enter his token serial number.

Presuming that the user name is confirmed, the "resync" process continues at step 202 by having the user enter the digits currently appearing on the token (for example, a six-digit number). A decision is then made to determine if the user-entered code matches the current code value for that serial number at provisioning server 22 (step 204). If the numbers correspond, the user is directed at step 206 to enter the next number being displayed on the token. If these numbers once again agree (as determined at step 208), the re-synchronization process has been successful, as noted at step 210, with the updated results being reported to options list 112. Returning to step 204, if the user-entered number does not agree with that stored in password server 22, the user is prompted, at step 212 to contact a customer care agent. Similarly, if the second set of digits entered by the user does not agree with the set stored in provisioning server 22 (step 208), the user is again directed to step 212 and requested to contact a customer care agent.

Figure 9:
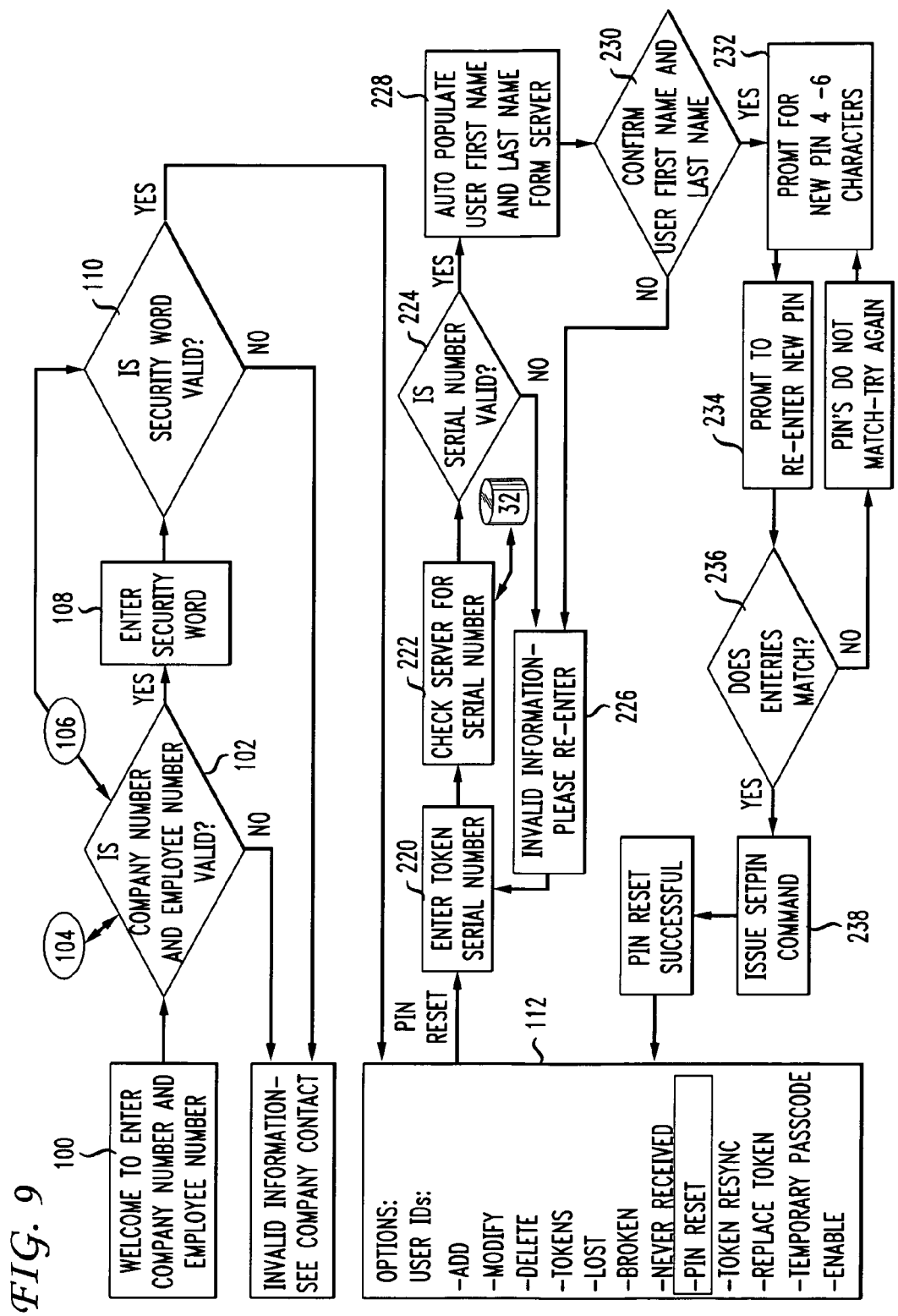
FIG. 9 illustrates one exemplary process that can be used to reset the PIN (i.e., enter a new PIN value) for an authenticated user.

If a user forgets his/her PIN, the process as outlined in FIG. 9 can be used to reset the PIN (i.e., enter a new PIN value). Referring to FIG. 9, the user selects the option "PIN reset" at options list 112. Once this option has been selected, the process requests, at step 220, for the user to enter the serial number of his/her token. As with the other processes, the serial number of the token is compared (at step 222) against the values stored in provisioning server 22, where if the user-entered value is not found (during the comparison at step 224), the user is requested at step 226 to re-enter his token serial number. If the serial number is validated, the process continues at step 228 by displaying the user first and last names for verification by the user. If the name is incorrect (step 230 comparison), the user is sent to step 226 to again re-enter his token serial number.

If the user's name is correctly displayed at step 230, the process continues at step 232 by prompting the user to enter a new PIN number (the PIN being of a predetermined length, and containing numbers and/or letters). The user is prompted to re-enter the new PIN at step 234, where the first and second entries are then compared at step 236. If the two entries doe not match, the process returns to step 232 and the user is invited to re-enter a new PIN. Presuming the first and second entered PINs match, the process continues by sending a request, at step 238 to transmit this "new" PIN to provisioning server 22 and associate this PIN with the user. A message is transmitted, at step 240, to acknowledge that the PIN reset process was successful.

While the invention has been particularly shown and described with reference to a preferred embodiment, it will be understood by those skilled in the art that various changes in form and detail may be made therein without departing from the spirit and scope thereof.

What is claimed is:

1. A method of authenticating a user to a plurality of disparate network elements and network systems having unique validation arrangements using a single authentication procedure, the method comprising:
   maintaining a centralized database of a plurality of authenticated users and associated user IDs/personal identification numbers (PINs) for the plurality of disparate network elements and network systems in a provisioning server;
   providing a token code generation unit within the provisioning server;
   distributing a separate security token card to each authenticated user; and
   re-synchronizing a distributed security token card with the token code generation unit upon receiving a predetermined number of invalid entry attempts at the centralized database.

2. The method as defined in claim 1 wherein the method further includes:
   an authenticated user activating his associated security token card with an entry of a valid user ID/PIN and a valid, current token security code, where said authenticated user is provided with an access to the plurality of disparate network elements and network systems in the single authentication procedure.

3. The method as defined by claim 1 wherein a third party vendor maintains the centralized database and distributes the security token cards to said plurality of authenticated users.

4. The method as defined by claim 1 wherein a corporate system subscriber maintains the centralized database and distributes the security token cards to said plurality of authenticated users.

5. The method as defined by claim 1 wherein the maintaining said centralized database of said plurality of authenticated users includes adding new users to said centralized database.

6. The method as defined in claim 1 wherein the distributing said security token cards comprises delivering said security token cards to said plurality of authenticated users utilizing an outside delivery system.

7. An authentication management platform for authenticating a user to a plurality of disparate network elements and network systems using a single authentication procedure, the authentication management platform comprising:
   a centralized database of user IDs/personal identification numbers (PINs) associated with a plurality of authenticated users permitted access to the plurality of disparate network elements and network systems; and
   a token code generator for interacting with a plurality of synchronized security token cards in possession of said plurality of authenticated users, the token code generator for providing a unique password for a one-time login attempt, with new passwords being generated at predetermined intervals, wherein in order to access the plurality of disparate network elements and network systems, a potential user accesses the authentication management platform and provides a user ID/PIN and a current value of his security token card;
   wherein said authentication management platform is configured to re-synchronize a security token card with the token code generator upon receiving a predetermined number of invalid entry attempts at the centralized database.

8. The authentication management platform as defined in claim 7 wherein the authentication management platform resides at a location of a subscriber and is maintained by the subscriber.

9. The authentication management platform as defined in claim 7 wherein the authentication management platform resides at a network location and is maintained by a third party.

* * * * *